United States Patent
Brandstätter et al.

(10) Patent No.: US 10,179,492 B2
(45) Date of Patent: Jan. 15, 2019

(54) METHOD FOR OPERATING A ROTATION DAMPER

(71) Applicant: AUDI AG, Ingolstadt (DE)

(72) Inventors: Wolfgang Brandstätter, Ingolstadt (DE); Marco Willems, Ingolstadt (DE); Vladimir Idelevitch, Nürnberg (DE); Wolfgang Merkes, München (DE); Hans-Jürgen Langhoff, Lenting (DE); Johannes Wittmann, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/290,220

(22) Filed: Oct. 11, 2016

(65) Prior Publication Data

US 2017/0100979 A1    Apr. 13, 2017

(30) Foreign Application Priority Data

Oct. 9, 2015    (DE) .......................... 10 2015 013 231

(51) Int. Cl.
| | |
|---|---|
| *H02P 25/30* | (2006.01) |
| *B60G 17/015* | (2006.01) |
| *B60G 13/14* | (2006.01) |
| *F16F 15/03* | (2006.01) |
| *H02P 9/00* | (2006.01) |

(52) U.S. Cl.
CPC ......... *B60G 17/0157* (2013.01); *B60G 13/14* (2013.01); *F16F 15/03* (2013.01); *F16F 15/035* (2013.01); *B60G 2202/20* (2013.01); *B60G 2202/22* (2013.01); *B60G 2300/60* (2013.01); *F16F 2232/06* (2013.01); *H02P 9/008* (2013.01)

(58) Field of Classification Search
CPC .................................................. H02P 2203/03
See application file for complete search history.

(56) References Cited

U.S. PATENT DOCUMENTS

| 8,573,604 B2 | 11/2013 | Willems |
| 8,646,787 B2 | 11/2014 | Langhoff et al. |
| 9,080,649 B2 | 7/2015 | Willems |
| 9,120,361 B2 | 9/2015 | Willems |

(Continued)

FOREIGN PATENT DOCUMENTS

| DE | 26 30 733 | 1/1978 |
| DE | 11 2010 005 559 T5 | 3/2013 |
| EP | 1 870 266 A1 | 12/2007 |

*Primary Examiner* — Karen Masih
(74) *Attorney, Agent, or Firm* — Henry M. Feiereisen LLC

(57) ABSTRACT

A method for operating a rotation damper for a motor vehicle which has an electric generator with a stator and a rotor includes detecting with a direction of rotation detection module a change of a direction of rotation of the rotor relative to the stator between a first direction of rotation and a second direction of rotation which is opposite to the first direction of rotation; generating with the direction of rotation detection module a signal indicative of an actual direction of rotation of the rotor relative to the stator; and as a function of the signal conducting an electrical current converted by the electric generator to a first electrical load having a first resistance value when the rotor rotates in the first direction of rotation, or to a second load having a second resistance value when the rotor rotates in the second direction of rotation.

14 Claims, 4 Drawing Sheets

(56) References Cited

U.S. PATENT DOCUMENTS

| | | |
|---|---|---|
| 9,136,743 B2 | 9/2015 | Willems |
| 9,193,239 B2 | 11/2015 | Willems |
| 9,300,188 B2 | 3/2016 | Willems |
| 9,227,475 B2 | 5/2016 | Ottinger et al. |
| 9,393,851 B2 | 7/2016 | Mohrlock et al. |
| 9,397,545 B2 | 7/2016 | Willems |
| 9,399,378 B2 | 7/2016 | Goldberg et al. |
| 9,415,655 B2 | 8/2016 | Willems |
| 2011/0148258 A1* | 6/2011 | Tanaka .................. H02K 23/66 310/68 B |
| 2012/0013277 A1 | 1/2012 | Ogawa |
| 2013/0049508 A1 | 2/2013 | Willems |
| 2013/0060422 A1 | 3/2013 | Ogawa et al. |
| 2013/0154404 A1 | 6/2013 | Willems |
| 2014/0217663 A1 | 8/2014 | Willems |
| 2014/0285043 A1 | 9/2014 | Willems |
| 2014/0360825 A1 | 12/2014 | Willems |
| 2015/0108321 A1 | 4/2015 | Willems |
| 2015/0159730 A1 | 6/2015 | Willems |
| 2015/0273969 A1 | 10/2015 | Willems |
| 2015/0306933 A1 | 10/2015 | Willems |

\* cited by examiner

METHOD FOR OPERATING A ROTATION DAMPER

CROSS-REFERENCES TO RELATED APPLICATIONS

This application claims the priority of German Patent Application, Serial No. 10 2015 013 231.8, filed Oct. 9, 2015, pursuant to 35 U.S.C. 119(a)-(d), the content of which is incorporated herein by reference in its entirety as if fully set forth herein.

BACKGROUND OF THE INVENTION

The invention relates to a method for operating a rotation damper and a system for operating a rotation damper.

The following discussion of related art is provided to assist the reader in understanding the advantages of the invention, and is not to be construed as an admission that this related art is prior art to this invention.

A rotation damper is arranged between a superstructure and a wheel of a motor vehicle and includes a generator, which generates an electrical current as a result of a relative movement between the wheel and the superstructure, thereby damping the relative movement of the wheel.

It would be desirable and advantageous to provide an improved method for operating a rotation damper.

SUMMARY OF THE INVENTION

According to one aspect of the present invention, a method for operating a rotation damper for a motor vehicle which has an electric generator with a stator and a rotor includes detecting with a direction of rotation detection module a change of a direction of rotation of the rotor relative to the stator between a first direction of rotation and a second direction of rotation which is opposite to the first direction of rotation; generating with the direction of rotation detection module a signal indicative of an actual direction of rotation of the rotor relative to the stator; and as a function of the signal conducting an electrical current converted by the electric generator to a first electrical load having a first resistance value when the rotor rotates in the first direction of rotation, or to a second load having a second resistance value when the rotor rotates in the second direction of rotation. The current can be conducted for example via and/or through the electrical load According to another advantageous feature of the invention, the value of the resistance of the electrical load is switched and/or set to a first value, when the rotor rotates in the first direction of rotation. On the other hand the value of the resistance of the electrical load is switched and/or set to a second value when the rotor rotates in the second direction of rotation.

According to one aspect of the present invention, a method for operating a rotation damper for a motor vehicle which has an electric generator with a stator and a rotor, includes detecting with a direction of rotation detection module a change of a direction of rotation of the rotor relative to the stator between a first direction of rotation and a second direction of rotation which is opposite to the first direction of rotation; generating with the direction of rotation detection module a signal indicative of an actual direction of rotation of the rotor relative to the stator; setting with the signal of the direction of rotation detection module a resistance of an electrical load to a first value when the rotor rotates in the first direction of rotation or to a second value when the rotor rotates in the second direction of rotation; and conducting an electrical current converted by the electric generator to the electrical load.

The rotation damper for which the method can be performed is fastened on one side on a body and/or a superstructure of the motor vehicle. This rotation damper has at least one control arm via which the rotation damper is connected on the other side with a wheel provided for movement of the motor vehicle. When the wheel undergoes a movement during a drive relative to the superstructure the electric generator is caused to move and thereby its rotor is rotated relative to the stator. Hereby the electric generator converts mechanical energy resulting from the movement of the wheel relative to the superstructure into electrical energy and the electrical current is generated, thereby damping the relative movement of the wheel. The wheel moves in the direction of the superstructure when undergoing a first movement, for example an upward movement, and moves away from the superstructure when undergoing a second movement. Hereby the generator is for example rotated in the first direction of rotation when the wheel moves in a first direction and is rotated in the second direction of rotation when the wheel moves in a second direction. The electric generator usually has three phases.

The current generated by the generator is converted into heat energy due to a respective resistance of the load to which the current is conducted.

The current is conducted to a first electrical load, for example via and/or through this first load which has the first value of the resistance, when the rotor rotates in the first direction of rotation. As an alternative the current is conducted to a second electrical load, for example via and/or through this second load, which has the second value of the resistance when the rotor rotates in the second direction of rotation.

According to another advantageous feature of the invention, the current is conducted from the generator to a single electrical load with variably adjustable resistance, wherein the resistance is set to the first value when the rotor rotates in the first direction of rotation and wherein the resistance of the load is set to the second value when the rotor rotates in the second direction of rotation.

As a result of setting the resistance of the electrical load in dependence on the direction of rotation a characteristic curve of the rotation damper is influenced which forms a connection between a force generated by the rotation damper for damping the wheel and a rotation angle and a direction of rotation of the electric generator. Normally selecting values of the load in dependence on the direction of rotation dependent adjusts mechanical properties of the rotation damper.

Depending on the definition of the rotation damper a compression force is generated when the rotor rotates in the first direction of rotation. In addition a pulling force is generated by the generator when the rotator rotates in the second direction of rotation or vice versa.

In addition, depending on the definition, the first value of the resistance of the load is greater than the second value of the resistance of the load or vice versa.

The method is performed for a rotation damper, which is assigned to a wheel of the motor vehicle, wherein a movement of the wheel relative to a superstructure of the motor vehicle is influenced, usually dampened.

The system according to the invention is configured for operating a rotation damper of a motor vehicle and includes an electric generator with a stator and a rotor. During operation of the rotation damper, when the generator is mechanically impinged, the rotor rotates relative to the stator in a first or a second direction of rotation, wherein these two directions of rotation are opposite each other. The rotor has a rotation angle relative to the stator. The system includes a direction of rotation detection module which is configured to detect a change of the direction of rotation. In addition an electrical current converted and/or generated by the electric generator can be conducted to an electrical load. Hereby the direction of rotation detection module is configured to switch and/or set a value of a resistance of the load to a first value when the rotor rotates in the first direction of rotation and to switch and/or set the value of the resistance of the load to the second value when the rotor rotates in the second direction of rotation.

According to another advantageous feature of the invention, the direction of rotation detection module is configured to conduct current to an electrical load having a first value of a resistance when the rotor rotates in the first direction of rotation. On the other hand the current which is converted by the electric generator can be conducted by the direction of rotation detection module to an electrical load having a second value of resistance when the rotor rotates in the second direction of rotation.

The system has at least one voltage measuring device, which is assigned to at least one phase of the electric generator and is configured to detect a value of the voltage that is applied to the at least one phase, wherein the direction of rotation detection module is for example configured to determine the direction of rotation of the rotor based on the value of the voltage. Hereby it is possible that the at least one voltage measuring device measures the voltage between two phases and/or between a phase and ground. Hereby the at least one voltage measuring device is switched between two phases. As an alternative or in addition each phase is assigned a respective voltage measuring device. Usually a parameter of the voltage, for example its direction and/or sign, is taken into account which then allows drawing a conclusion regarding the actual direction of rotation. An absolute value of the voltage is only taken into account when this allows drawing a conclusion regarding the direction of rotation.

In addition the system has at least one path via which the generator is connected with the electrical load, wherein the load is arranged along this at least one path.

According to another advantageous feature of the invention, the system includes two paths that are connected parallel to each other, wherein the generator is connected with a first load which has the first value of resistance via a first path. In addition the generator is connected with a second load via a second path, which second load has the second value of the resistance. The two loads and with this the respective values of the resistance are dimensioned differently.

The direction of rotation detection module is configured to control at least one switch and/or at least one load regulation module with which the value of the assistance of the load can be adjusted.

The at least one switch is arranged at a branch point of the two paths that are connected in parallel with each other and is configured to conduct the current in dependence on the direction of rotation along the first path or along the second path.

According to another advantageous feature of the invention, the system has a load with a variably adjustable resistance, which is connected with the generator via a path, and a load regulation module via which the direction of rotation detection module is connected with the load, wherein the load regulation module, for example by actuating a switch, is configured to adjust and/or switch on the first value of the resistance for the load, when the rotor rotates in the first direction of rotation or to adjust and/or switch on the second value of the resistance when the rotor rotates in the second direction of rotation.

Thus for performing the method in an alternative manner a system can be used that has only a single load, wherein a value of the resistance of this single load can be adjusted and/or changed depending on the direction of rotation. When the system only has a single load with variably adjustable resistance the load is connected with the generator via a path. Such a load can for example be configured as a potentiometer and can be controlled by the load regulation module and/or a switch based on the direction of rotation detection module. Alternatively the variably adjustable load can be configured as a current sink whose current uptake can be adjusted in dependence on the direction of rotation, whereby the value of the resistance of the variably adjustable load is also adjusted in dependence on the direction of rotation.

The method according to the invention thus makes it possible to adjust two characteristic curves that are configured as damper characteristic curves, wherein for example a first characteristic curve applies for the rotation damper, when the rotor rotates relative to the stator in the first direction of rotation and wherein a second characteristic curve applies for the rotation damper when the rotor rotates relative to the stator in the opposite second direction of rotation. Depending on the definition a compression stage is implemented when the rotor rotates in the first direction of rotation and a pulling stage is implemented when the rotor rotates in the second direction of rotation.

Arranged downstream of the usually three-phase generator is a direction of rotation detection module which includes a digital converter. The direction of rotation recognition module can include the voltage measuring device.

A signal which contains information regarding a respective actual direction of rotation and a respective actual rotation angle of the rotor relative to the stator is generated by the voltage measuring device and/or the direction of rotation detection device. The value of the resistance of the load can be adjusted via this signal. When the system has two loads the switch at the branching point of the two paths can be controlled by the signal. When the system only includes one load, the value of the resistance of the single load can be variably adjusted by the signal. Thus no designated sensor system is required for detecting the direction of rotation of the rotor for example a Hall sensor a resolver or an incremental encoder for the electric generator. A detection and/or analysis of the signal which contains information regarding the respective actual direction of rotation of the rotor can be software-supported and/or hardware-supported.

The two possible characteristic curves depend among other things on the rotation angle of the rotor and also on the rotary angular speed. When performing the method according to the invention the value of the resistance of the load is set and/or switched in dependence on a detected direction of rotation. When a compression force is generated by the rotation damper the wheel is usually compressed during a movement toward the superstructure. On the other hand the rotation damper generates a pulling force when the wheel moves away from the superstructure and is decompressed. Thus for the compression force and the pulling force a respective characteristic curve is provided, and a switching between the two characteristic curves is performed.

A respective one of the characteristic curves results due to the relationship I=U/R between the voltage which results in dependence on a rotational speed of the generator in the damper and/or in dependence on a rotary angular speed, the current I whose generation and conversion into heat results in a damping force, i.e., the compression force or pulling force of the rotation damper, and the resistance R which is set in dependence on the direction of rotation.

Hereby the current is proportional to a torque which results due to a movement of the wheel relative to the superstructure via the at least one control arm. When the value of the resistance of the load is switched between the compression stage and the pulling stage a value of the current and with this also of the torque of the generator changes, whereby a changed damping force results for the wheel in dependence on the direction of rotation. By varying the value of the at least one resistance the current can be adjusted via a compression speed or decompression speed of the wheel and is no longer bound to a constant fixedly set resistance.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
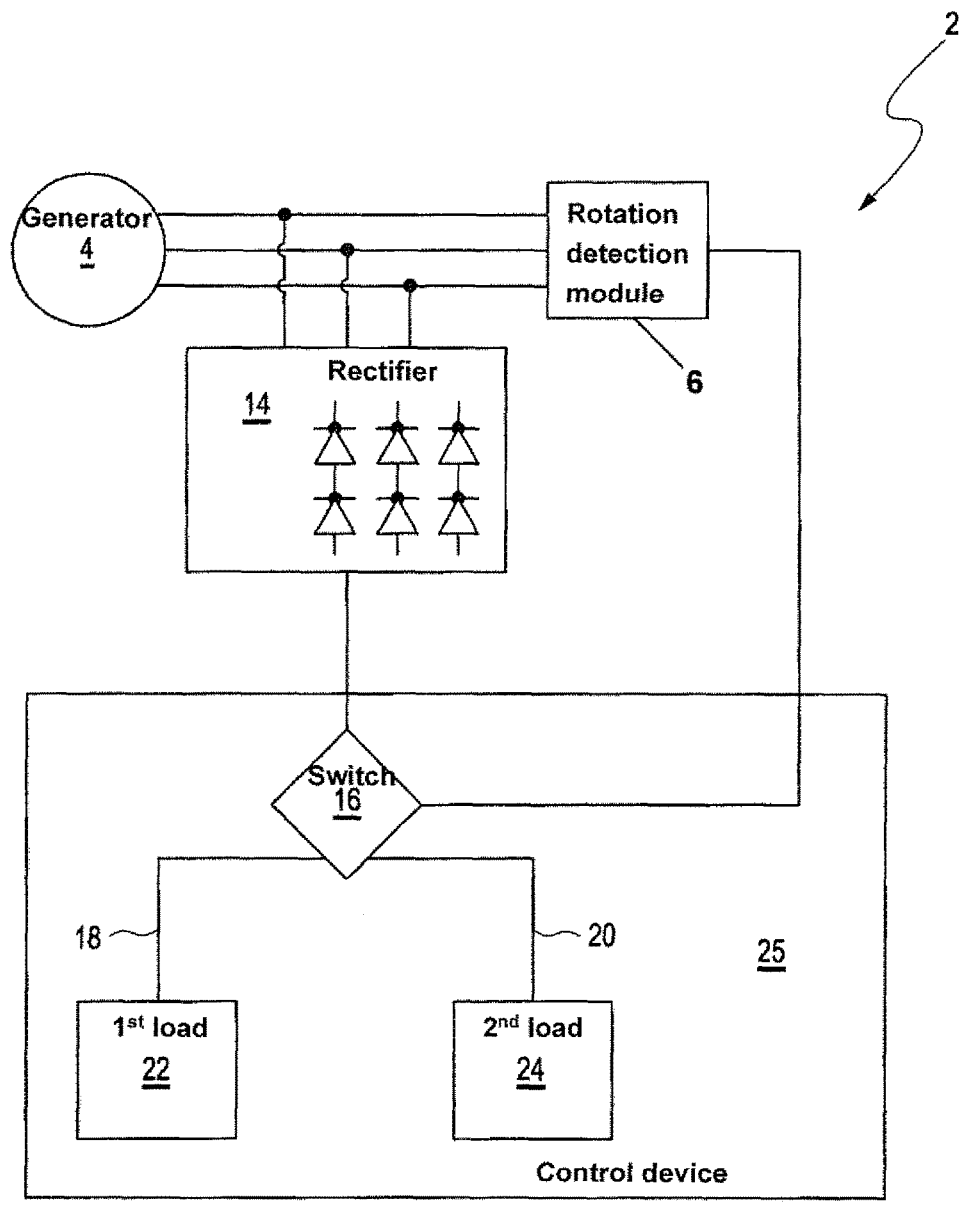
FIG. 1 shows a schematic representation of a first embodiment of the system according to the invention.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
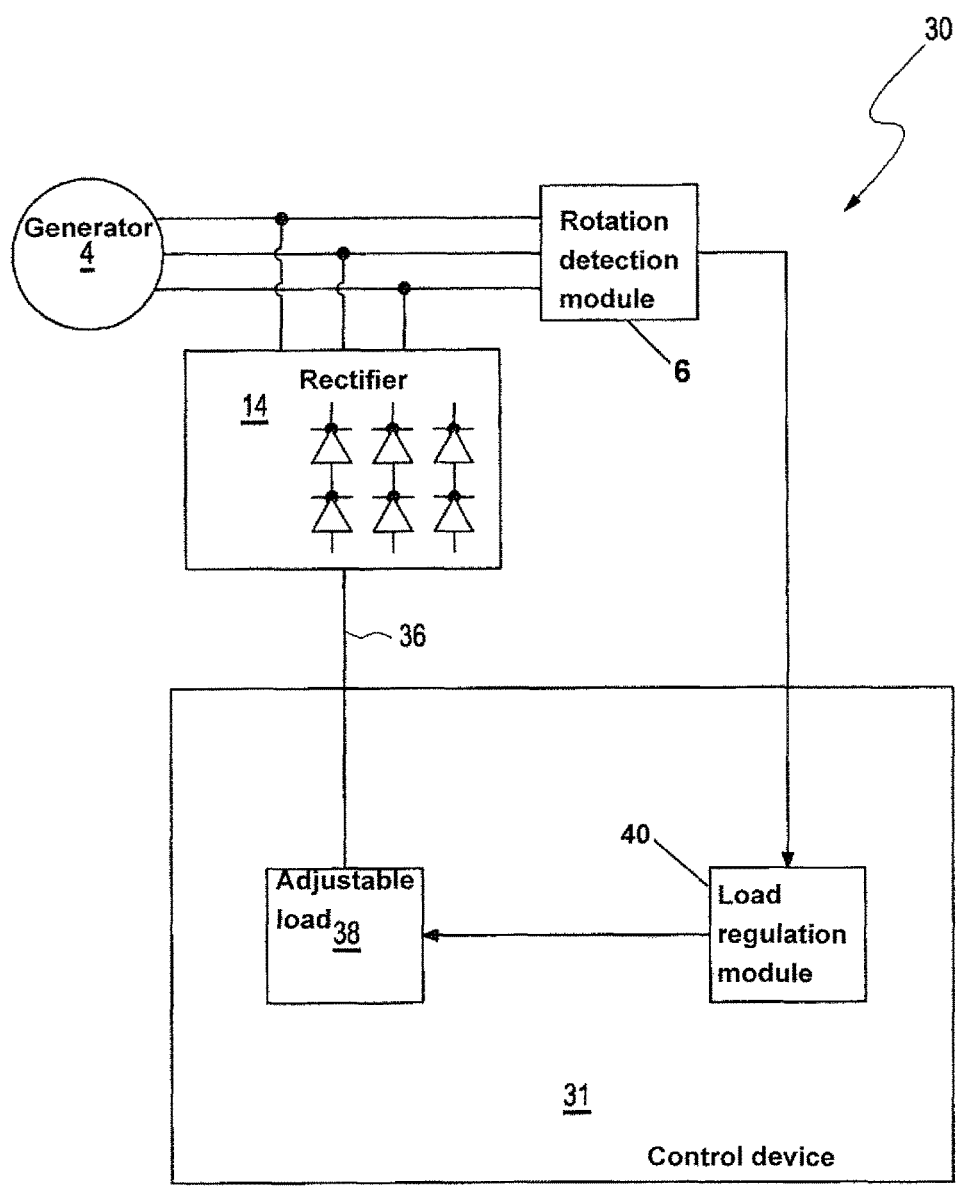
FIG. 2 shows a schematic representation of a second embodiment of the system according to the invention.
Figure 3:
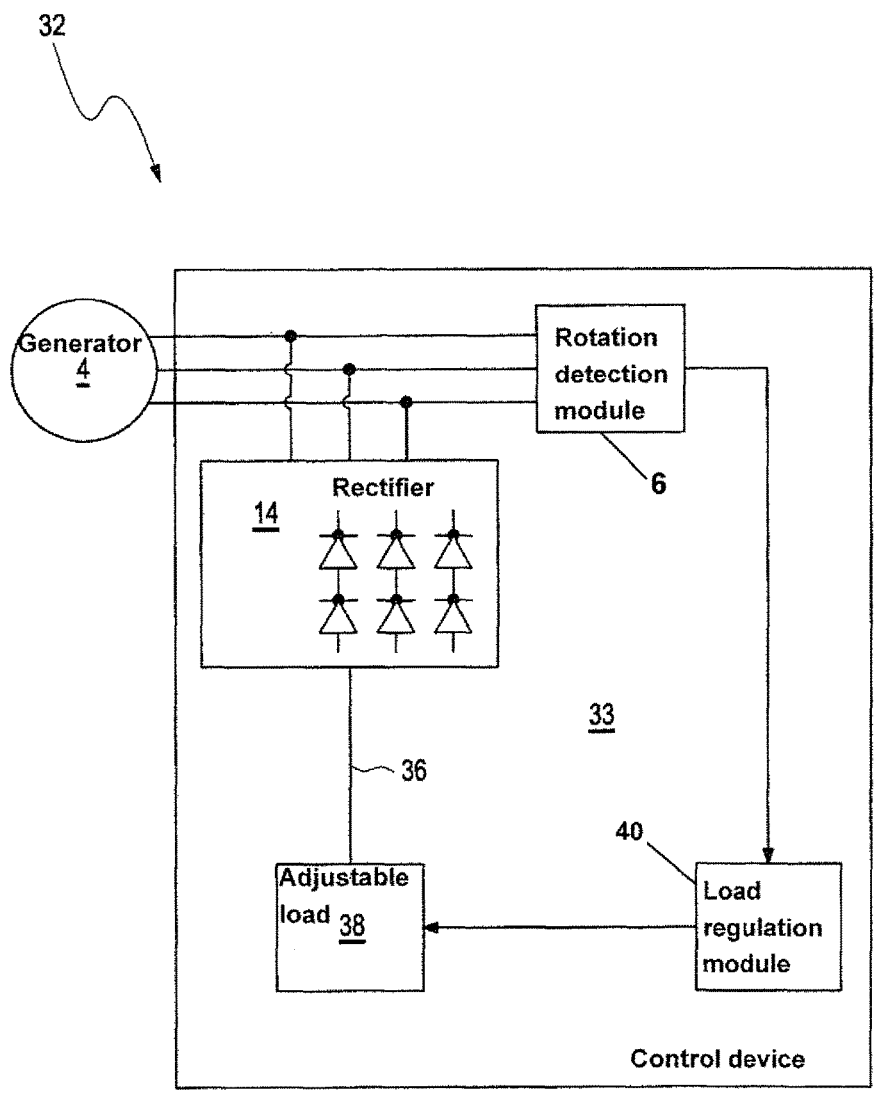
FIG. 3 shows a schematic representation of a third embodiment of the system according to the invention.
Figure 4:
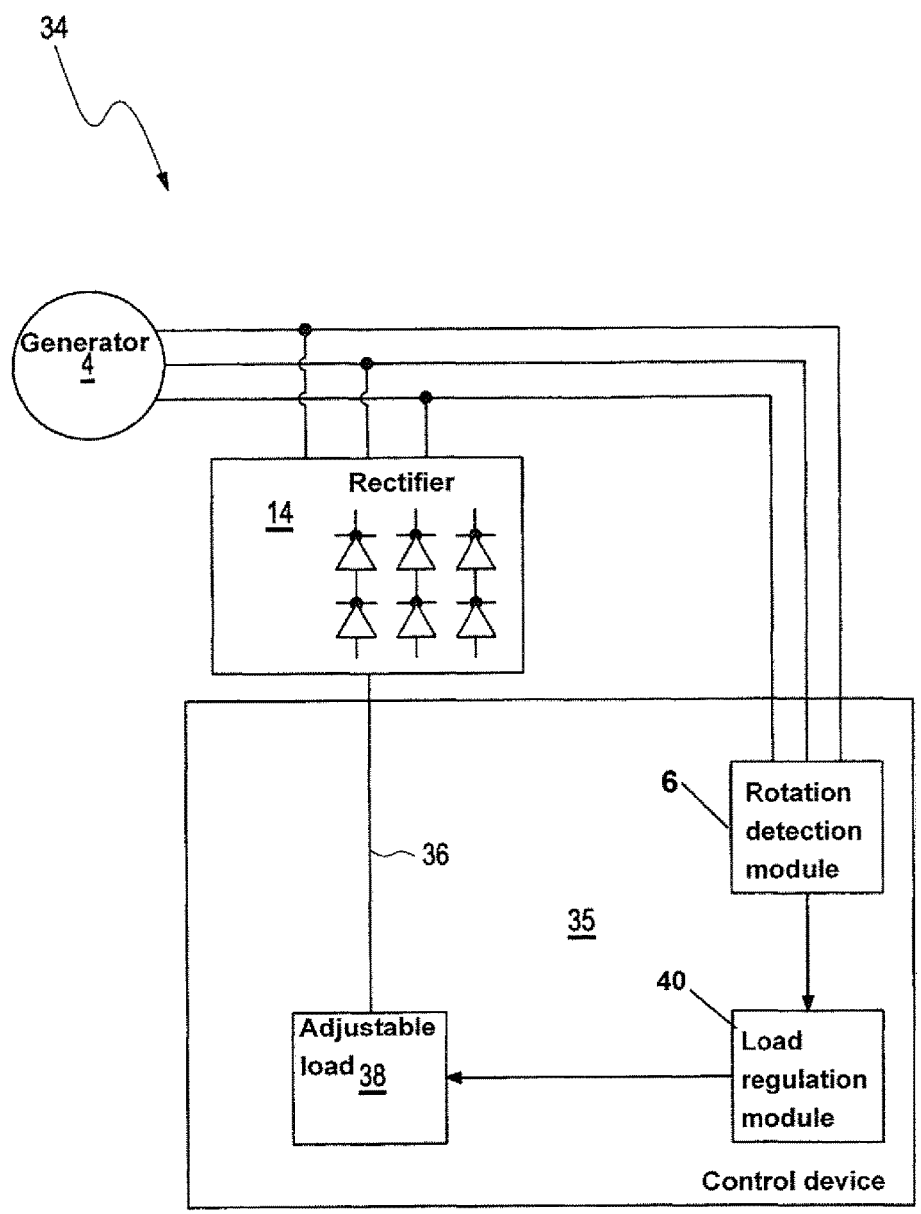
FIG. 4 shows a schematic representation of a fourth embodiment of the system according to the invention.

The first embodiment of the system 2 according to the invention is schematically shown in FIG. 1, the second embodiment of the system 30 according to the invention schematically shown in FIG. 2, the third embodiment of the system 32 according to the invention schematically shown in FIG. 3, and the fourth embodiment of the system 34 according to the invention schematically shown in FIG. 4, respectively include a here three-phase electric generator 4 which at the same time also form s a component of a rotation damper for a motor vehicle. The rotor 5 and the stator 7 of the generator 4 are part of the damper 8.

Hereby the rotation damper is fastened at a superstructure of the motor vehicle. In addition the rotation damper has at last one control arm via which the rotation damper is fastened with a wheel of the motor vehicle. In the case of a movement of the motor vehicle also the wheel is moved relative to the superstructure whereby due to such a movement a rotor of the generator 4 is moved relative to the stator of the generator 4 and mechanical energy is converted into electrical energy, whereby the generator generates an electrical current. In addition each embodiment of the system 2, 30, 32, 34 includes as a further component a rotation direction detection module 6, which in the present case includes a voltage measuring device and a rectifier 14 configured as a bridge rectifier for multiple, here three, phases of the generator 4. The rectifier 14 is for example configured passive or active. When the rectifier 14 is configured passive it includes multiple diodes. When the rectifier 14 is configured active it includes multiple MOSFETs.

The first embodiment of the system can include additional components, which can also be components of the rotation damper, here a first path 18 and a second path 20. Hereby a first electrical load 22 is arranged along the first path 18 and/or at the end of the first path 18. A second electrical load 24 is arranged along the second path 20 and/or at the end of the second path 20. The two loads 20, 24 are configured as resistances, wherein the first load 22 has a first value for an electrical resistance and the second load 24 has a second value for an electrical resistance, wherein the values of the resistances of the two loads 22, 24 are of different magnitudes. The switch 16, the two paths 18, 20 and the two loads 22, 24 are here arranged in a control device 25 of the system 2 which at the same time is also configured as a component of the rotation damper.

When performing an embodiment of the method according to the invention a respective actual direction of rotation of the rotor relative to the stator is determined by the direction of rotation detection module 6. The rotor either rotates in a first direction of rotation or in a second direction of rotation relative to the stator.

Depending on the direction of rotation in which the rotor rotates the switch 16 is controlled by the direction of rotation detection module 6 with a signal, which contains information regarding the actual direction of rotation of the rotor. Depending on the direction of rotation the switch either releases the first path 18 and blocks the second path 20 or blocks the first path 18 and releases the second path 20. When the rotor rotates in the first direction of rotation the current of the generator 4 is only conducted via the first path 18 to the load 22 having a first value of the resistor and is converted into heat. When on the other hand the rotor rotates in the second direction of rotation the current of the generator 4 is conducted via the second path 20 to the second load 24 having the second value of the electrical resistance and converted into heat energy. When the direction of rotation detection module 6 detects a change of the direction of rotation of the rotor the switch 16 is switched back and forth between its two possible positions thereby a changing between the two loads 22, 24.

The further embodiments of the system 30, 32, 34 according to the invention schematically shown in the FIGS. 2, 3, and 4 also include a three-phase electric generator 4, which at the same time is configured as a component of a rotation damper for a motor vehicle. Also in this case the generator 4 is connected with a respective direction of rotation detection module 6 which in this case includes a voltage measuring device, and with a rectifier configured as a bridge rectifier.

In contrast to the first embodiment of the system 2 of FIG. 1 the further embodiments of the system 30, 32, 34 of FIGS. 2 to 4 also have in common that the generator 4 is connected with a variably adjustable load 38 via the rectifier 14 and a path 36, wherein a value of a resistance of this variably adjustable load 38 can be changed. In addition in the further embodiments of the system 30, 32, 34 the direction of rotation detection module 6 is connected with a load regulation module 40, which has a signal input for a switching into a load regulation. In addition the load regulation module 40 is connected with a variably adjustable electrical load 38.

When performing a further embodiment of the method according to the invention which can be performed with one of the further embodiments of the system 30, 32, 34 a respective actual direction of rotation of the rotor relative to the stator is detected by the direction of rotation detection module 6. The rotor either rotates in a first direction of rotation or in a second direction of rotation relative to the stator.

A signal of the direction of rotation detection module 6, which contains information regarding an actual direction of rotation of the rotor, is transmitted to the load regulation module 40. Depending on the direction of rotation the variably adjustable load 38 is controlled by the load regulation module 40. Hereby a first value is set for the resistance of the variably adjustable load 38 when the rotor rotates in the first direction of rotation or a second value is set when the rotor rotates in the second direction of rotation. Current generated by the generator 4 and flowing via the path 36 to the variably adjustable load 38 is converted by the load 38 into heat in dependence on the direction of rotation.

The second embodiment of the system 30 (FIG. 2) includes a control device 31 in which the variably adjustable load 38 and the load regulation module 40 are arranged. A control device 33 of the third embodiment of the system 32 includes the direction of rotation detection module 6, the rectifier 14, the variable load 38 and the load regulation module 40. In the fourth embodiment of the system 34 (FIG. 4) the direction of rotation detection module 6, the variably adjustable load 38 and the load regulation module 40 are arranged in a control device 35.

What is claimed as new and desired to be protected by Letters Patent is set forth in the appended claims and includes equivalents of the elements recited therein:

1. A method for operating a rotation damper for a motor vehicle which has an electric generator with a stator and a rotor, said method comprising:
   detecting with a direction of rotation detection module a change of a direction of rotation of the rotor relative to the stator between a first direction of rotation and a second direction of rotation which is opposite to the first direction of rotation;
   generating with the direction of rotation detection module a signal indicative of an actual direction of rotation of the rotor relative to the stator; and
   as a function of the signal conducting an electrical current converted by the electric generator to a first electrical load having a first resistance value when the rotor rotates in the first direction of rotation, or to a second load having a second resistance value when the rotor rotates in the second direction of rotation,
   wherein the first resistance value is greater than the second resistance value.

2. A method for operating a rotation damper for a motor vehicle which has an electric generator with a stator and a rotor, said method comprising:
   detecting with a direction of rotation detection module a change of a direction of rotation of the rotor relative to the stator between a first direction of rotation and a second direction of rotation which is opposite to the first direction of rotation;
   generating with the direction of rotation detection module a signal indicative of an actual direction of rotation of the rotor relative to the stator;
   setting with the signal of the direction of rotation detection module a resistance of an electrical load to a first value when the rotor rotates in the first direction of rotation or to a second value when the rotor rotates in the second direction of rotation; and
   conducting an electrical current converted by the electric generator to the electrical load,
   wherein the first value of the resistance is greater than the second value of the resistance.

3. The method of claim 1, wherein the rotation damper generates a compression force when the rotor rotates in the first direction of rotation and the rotation damper generates a pulling force when the rotor rotates in the second direction of rotation.

4. The method of claim 1, further comprising influencing with the rotation damper a movement of a wheel of the motor vehicle relative to the superstructure of the motor vehicle, said wheel being assigned to the rotation damper.

5. A system for operating a rotation damper for a motor vehicle, said system comprising:
   a rotation damper comprising a generator which has a rotor and a stator, said rotor rotating relative to the stator in a first direction or rotation or a second direction of rotation which is opposite to the first direction of rotation, said rotor having a rotary angle relative to the stator;
   a direction of rotation detection module configured
   to detect a change between the first direction of rotation and the second direction of rotation, and to generate a signal indicative of the direction of rotation of the rotor relative to the stator, and
   to conduct the current as a function of the signal to a first electrical load having a first value of resistance when the rotor rotates in the first direction of rotation or to a second electrical load having a second value of resistance when the rotor rotates in the second direction of rotation,
   wherein the first value of the resistance is greater than the second value of the resistance.

6. The system of claim 5, further comprising at least one voltage measuring device assigned to at least one phase of the electric generator and configured to detect a value of the voltage resting on the at least one phase, and wherein the direction of rotation detection module is configured to determine the direction of rotation of the rotor as a function of the value of the voltage.

7. The system of claim 5, further comprising at least one path via which the generator is connected with the first and second electrical loads.

8. The system of claim 5, wherein the direction of rotation detection module is configured to control at least one switch adapted for setting the value of the resistance of the first and second electrical loads.

9. The system of claim 7, comprising two said paths connected parallel to each other, wherein the generator is connectable via a first one of the two paths with the first electrical load having the first value of resistance and via the second path with the second electrical load having the second value of the resistance.

10. The system of claim 8, wherein the at least one switch is arranged at a branch point of the two paths and is configured to conduct the current along the first path or along the second path in dependence on the direction of rotation.

11. A system for operating a rotation damper for a motor vehicle, said system comprising:
- a rotation damper including a generator which has a rotor and a stator, said rotor rotating relative to the stator in a first direction or rotation or a second direction of rotation which is opposite to the first direction of rotation, said rotor having a rotary angle relative to the stator;
- a direction of rotation detection module configured
- to detect a change between the first direction of rotation and the second direction of rotation, and to generate a signal indicative of the direction of rotation of the rotor relative to the stator,
- to set with the signal a resistance of a load to a first value when the rotor rotates in the first direction of rotation or to a second value when the rotor rotates in the second direction of rotation, and
- to conduct a current converted by the electric generator to the electrical load,
- wherein the first value of the resistance is greater than the second value of the resistance.

12. A method for operating a rotation damper for a motor vehicle which has an electric generator with a stator and a rotor, said method comprising:
- detecting with a direction of rotation detection module a change of a direction of rotation of the rotor relative to the stator between a first direction of rotation and a second direction of rotation which is opposite to the first direction of rotation;
- generating with the direction of rotation detection module a signal indicative of an actual direction of rotation of the rotor relative to the stator; and
- as a function of the signal conducting an electrical current converted by the electric generator to a first electrical load having a first resistance value when the rotor rotates in the first direction of rotation, or to a second load having a second resistance value when the rotor rotates in the second direction of rotation,
- wherein at least one voltage measuring device assigned to at least one phase of the electric generator and configured to detect a value of the voltage resting on the at least one phase, and wherein the direction of rotation detection module is configured to determine the direction of rotation of the rotor as a function of the value of the voltage.

13. A system for operating a rotation damper for a motor vehicle, said system comprising:
- a rotation damper comprising a generator which has a rotor and a stator, said rotor rotating relative to the stator in a first direction or rotation or a second direction of rotation which is opposite to the first direction of rotation, said rotor having a rotary angle relative to the stator;
- a direction of rotation detection module configured
- to detect a change between the first direction of rotation and the second direction of rotation, and to generate a signal indicative of the direction of rotation of the rotor relative to the stator, and
- to conduct the current as a function of the signal to a first electrical load having a first value of resistance when the rotor rotates in the first direction of rotation or to a second electrical load having a second value of resistance when the rotor rotates in the second direction of rotation,
- the system further comprising at least one voltage measuring device assigned to at least one phase of the electric generator and configured to detect a value of the voltage resting on the at least one phase, and wherein the direction of rotation detection module is configured to determine the direction of rotation of the rotor as a function of the value of the voltage.

14. A system for operating a rotation damper for a motor vehicle, said system comprising:
- a rotation damper including a generator which has a rotor and a stator, said rotor rotating relative to the stator in a first direction or rotation or a second direction of rotation which is opposite to the first direction of rotation, said rotor having a rotary angle relative to the stator;
- a direction of rotation detection module configured
- to detect a change between the first direction of rotation and the second direction of rotation, and to generate a signal indicative of the direction of rotation of the rotor relative to the stator,
- to set with the signal a resistance of a load to a first value when the rotor rotates in the first direction of rotation or to a second value when the rotor rotates in the second direction of rotation, and
- to conduct a current converted by the electric generator to the electrical load,
- the system further comprising at least one voltage measuring device assigned to at least one phase of the electric generator and configured to detect a value of the voltage resting on the at least one phase, and wherein the direction of rotation detection module is configured to determine the direction of rotation of the rotor as a function of the value of the voltage.

* * * * *

UNITED STATES PATENT AND TRADEMARK OFFICE
CERTIFICATE OF CORRECTION

PATENT NO.           : 10,179,492 B2
APPLICATION NO.      : 15/290220
DATED                : January 15, 2019
INVENTOR(S)          : Wolfgang Brandstätter et al.

It is certified that error appears in the above-identified patent and that said Letters Patent is hereby corrected as shown below:

In the Claims

In Column 8, Claim 5, Line 26: replace "direction or rotation" with --direction of rotation--.
In Column 9, Claim 11, Line 5: replace "direction or rotation" with --direction of rotation--.
In Column 10, Claim 13, Line 1: replace "direction or rotation" with --direction of rotation--.
In Column 10, Claim 14, Line 27: replace "direction or rotation" with --direction of rotation--.

Signed and Sealed this
Second Day of July, 2019

Andrei Iancu
*Director of the United States Patent and Trademark Office*